United States Patent
Su et al.

(10) Patent No.: US 10,345,337 B2
(45) Date of Patent: Jul. 9, 2019

(54) SCANNING PROBE MICROSCOPY UTILIZING SEPARABLE COMPONENTS

(71) Applicant: Bruker Nano, Inc., Tucson, AZ (US)

(72) Inventors: Chanmin Su, Ventura, CA (US); Izhar Medalsy, Santa Barbara, CA (US); Weijie Wang, Santa Barbara, CA (US)

(73) Assignee: Bruker Nano, Inc., Tucson, AZ (US)

( * ) Notice: Subject to any disclaimer, the term of this patent is extended or adjusted under 35 U.S.C. 154(b) by 0 days.

(21) Appl. No.: 15/952,368

(22) Filed: Apr. 13, 2018

(65) Prior Publication Data

US 2018/0299481 A1 Oct. 18, 2018

Related U.S. Application Data

(60) Provisional application No. 62/485,186, filed on Apr. 13, 2017.

(51) Int. Cl.
| | |
|---|---|
| *G01Q 70/14* | (2010.01) |
| *G01Q 10/06* | (2010.01) |
| *G01Q 20/02* | (2010.01) |
| *G01Q 70/02* | (2010.01) |
| *G01Q 60/38* | (2010.01) |

(52) U.S. Cl.
CPC .............. *G01Q 70/14* (2013.01); *G01Q 10/06* (2013.01); *G01Q 20/02* (2013.01); *G01Q 70/02* (2013.01); *G01Q 60/38* (2013.01)

(58) Field of Classification Search
CPC ........ G01Q 70/14; G01Q 60/38; G01Q 10/06; G01Q 20/02
USPC ............................ 850/52, 53, 56
See application file for complete search history.

(56) References Cited

U.S. PATENT DOCUMENTS

| | | | |
|---|---|---|---|
| 4,935,634 A | 6/1990 | Hansma et al. | |
| RE34,489 E | 12/1993 | Hansma et al. | |
| 5,705,814 A | 1/1998 | Young et al. | |
| 8,578,511 B2* | 11/2013 | Liu | G01Q 60/58 850/40 |
| 8,925,111 B1* | 12/2014 | Park | G01Q 70/02 73/105 |
| 2013/0019352 A1* | 1/2013 | Liu | G01Q 60/58 850/50 |

FOREIGN PATENT DOCUMENTS

CN 100573732 C 12/2009

OTHER PUBLICATIONS

Leite et al., "Theoretical Models for Surface Forces and Adhesion and Their Measurement Using Atomic Force Microscopy," International Journal of Molecular Sciences, 13, 12773-12856, 2012, 84 pages.

* cited by examiner

*Primary Examiner* — Michael Maskell
(74) *Attorney, Agent, or Firm* — Patterson Thuente Pedersen, P.A.

(57) ABSTRACT

According to embodiments, a cantilever probe for use with an atomic force microscope (AFM) or scanning probe microscope (SPM) has a pad of conformable material that facilitates non-permanent adhesion through van der Waals interactions. Such removable probes and probe tips facilitate use of multiple tips or probes, while reducing the need for recalibration or repositioning.

18 Claims, 11 Drawing Sheets

SCANNING PROBE MICROSCOPY UTILIZING SEPARABLE COMPONENTS

RELATED APPLICATION

The present application claims the benefit of U.S. Provisional Application No. 62/485,186 filed Apr. 13, 2017, which is hereby incorporated herein by reference in its entirety

FIELD OF THE INVENTION

The present invention relates generally to scanning probe microscopy such as atomic force microscopy, and more particularly to a cantilever-based scanning probe microscope system that utilizes a probe tip situated at the end of a cantilever.

BACKGROUND OF THE INVENTION

Scanning probe microscopes (SPMs), such as the atomic force microscope (AFM), are instruments which typically use a sharp tip to characterize the surface of a sample down to nanoscale and even sub-nanoscale dimensions. The term nanoscale as used for purposes of this disclosure refers to dimensions smaller than one micrometer. Sub-nanoscale refers to dimensions smaller than one nanometer. SPMs monitor the interaction between the sample and the probe tip. By providing relative scanning movement between the tip and the sample, surface characteristic data can be acquired over a particular site on the sample, and a corresponding map of the site can be generated. Because of their resolution and versatility, SPMs are important measurement devices in many diverse fields including semiconductor manufacturing, material science, nanotechnology, and biological research.

The probe of a typical SPM includes a very small cantilever fixed to a much larger support (i.e., a "handle") at its base that is in turn attached to a mounting mechanism for attaching to the positioning mechanism. At the opposite, free, end of the cantilever is a sharp probe tip. The probe tip is brought very near to or into contact with a surface of a sample to be examined, and the deflection of the cantilever in response to the probe tip's interaction with the sample is measured with an extremely sensitive deflection detector such as an optical lever system as described, for example, in U.S. Pat. No. RE 34,489 to Hansma et al., or some other deflection detector such as strain gauges, capacitance sensors, etc. Optical detectors typically comprise a laser spot directed onto the cantilever arm and arranged to reflect off the cantilever arm onto the deflection sensor.

The probe is scanned over a surface using a high resolution three-axis scanner acting on the sample support, the probe, or a combination of both. The instrument is thus capable of measuring the topography or other surface properties or nanomechanical properties of the sample. Cantilever probes can be made from conductive material, enabling measurement of electrical properties.

SPMs may be configured to operate in a variety of modes, including modes for measuring, imaging, or otherwise inspecting a surface, and modes for measuring nanomechanical properties of a sample. In a contact mode operation, the microscope typically scans the tip across the surface of the sample while maintaining a constant probe-sample interaction force. In an oscillation mode of operation, sometimes referred to as tapping mode, the tip of the SPM is oscillated while interacting with the sample at or near a resonant frequency of the cantilever of the probe. The amplitude or phase angle of this oscillation is affected by the probe-sample interaction, and changes in the oscillation are sensed.

As the probe is scanned over the surface of the sample, a probe positioning control system monitors the interaction of the probe with the sample surface such as, for example, deflection of the cantilever (in the case of contact mode), or changes in the oscillation amplitude or phase angle (in the case of oscillating mode). The control system adjusts the probe's position (or average position in the case of oscillating mode) relative to the sample to maintain a constant probe-sample interaction. The position adjustment thus tracks the topography of the sample. In this way, the data associated with the position adjustment can be stored, and processed into data that characterizes the sample. This data can be used to construct an image of the inspected sample's surface, or to make certain measurements of selected surface features (such as, for example, a height of the feature).

The resolution of the data obtained by such probe-based instruments is limited by the physical characteristics of the tip of the probe itself. For surface inspection applications, the tip shape is reflected in the acquired data, a problem that is exacerbated by the fact that SPMs often image very small (e.g., Angstrom-scale) features. As a result, an error in the acquired data results and the corresponding accuracy of the surface image is significantly compromised. Similarly, for nanomechanical property measurement applications, the shape of the probe tip, i.e., its sharpness, substantially affects the force-deformation relationship.

Accordingly, probe tip wear presents a problem that must be addressed in SPM applications. Wear of the probe tip occurs when the probe tip interacts with the sample in the course of conducting measurements. Material can be lost from, and in some cases picked up by, the probe tip, causing changes in the size and shape of the tips. Different types of probes (in terms of shape or materials) have different wear characteristics, and even probes of the same type can wear differently for a variety of reasons. Structurally identical probes can experience different wear trends depending on the nature of the samples being scanned by the probe, the corresponding diverse types of interaction between the probe tip and the samples, and other changing circumstances.

Eventually the probe tip is worn down to a condition where it must be replaced. Replacement of the probe tip involves disengaging the probe from the sample, removing the probe from its mount, and installing a replacement probe onto the mount. The installation of the replacement probe may cause a positional offset between the probe and the probe positioning system to which the probe handle is mounted. This difference in alignment has a magnitude that can be even greater than the size of the sample region being measured by the instrument. Therefore, replacement of the probe presents a practical difficulty of resuming measurement from the point where the measuring process was interrupted. In laser-deflectometer systems, the laser spot needs to be re-aligned to the new position of the cantilever of the replacement probe. The calibration process takes a significant amount of time.

Conventional probe mounting systems use mechanical means for mounting or replacing probe tips. For example, as describe in U.S. Pat. No. 5,705,814 (filed Aug. 30, 1995), probe alignment can be automated to speed up re-calibration procedures. Techniques for error-checking are used after a vacuum-assisted pickup procedure, to calibrate a new probe "clamped to the probe mount using a vacuum clamp, a mechanical clamp, an electrostatic clamp, or other similar clamp."

Likewise, U.S. Pat. No. 8,925,111 (filed Dec. 4, 2013) describes a chuck with a stacker apparatus configured to mechanically hold several tips. A method is disclosed that prevents contact between the chuck and the head module, which can cause decalibration, and probe tips are held mechanically using a vacuum (as shown, for example, in FIG. 10B).

In addition to mechanical probe mounting systems, some conventional systems incorporate chemical mounting (i.e., adhesives). Chinese Patent No. 100573732C (filed Feb. 28, 2008), for example, describes a cured binder adhesive material composition, capable of curing at room temperature in air. Although such systems maintain a desired geometric arrangement between the driver and the tip, crosslinked chemical compositions are generally more difficult to remove than mechanical ones. Furthermore, some materials can outgas chemicals in vacuum environments, including solvents, plasticizers, or un-crosslinked monomers.

SUMMARY OF THE INVENTION

Rather than using mechanical or chemical binding mechanisms to fasten the probe tip to the driver, it is possible to use inter-atomic forces to create the desired level of adhesion. In particular, rather than using a mechanical coupling or an adhesive, embodiments are described herein in which a conformable pad is placed at the interface between the driver and the handle, or between the cantilever and the tip, or atomic force microscope probes. By using an appropriate conformable material, van der Waals interactions hold the adjacent components together. In some embodiments, the van der Waals forces between small components can be stronger than a vacuum or adhesive bond, and removal and replacement of a tip can be accomplished without requiring the recalibration necessitated by conventional mechanical fastening, and without outgassing or the permanence of chemical fastening.

According to embodiments, a cantilever probe system includes a cantilever having a proximal end and a distal end, the distal end having a bottom surface, a handle mechanically coupled to the proximal end of the cantilever, the handle having an upper surface, a tip mechanically coupled to the bottom surface of the cantilever, and a pad arranged on the upper surface and configured to reversibly mechanically couple the upper surface to an adjacent driver.

According to another embodiment, a cantilever probe system includes a cantilever having a proximal end and a distal end, the distal end having a bottom surface, a handle mechanically coupled to the proximal end of the cantilever, the handle having an upper surface, a tip mechanically having a base coupled to the bottom surface of the cantilever, and a pad arranged on the bottom surface and configured to reversibly mechanically couple the bottom surface to the base surface.

According to yet another embodiment, a scanning probe microscope (SPM) or atomic force microscope (AFM) system includes an actuator system configured to impart relative motion between a cantilever probe system and a sample. The cantilever probe system includes a handle defining an upper surface, a cantilever extending from a proximal end at the handle to a distal end, the distal end defining a bottom surface, and a tip that includes a base surface and an apex opposite the base surface. A controller system is electrically coupled with the actuator system and configured to control motion and positioning of the actuator system. A driver is coupled to the actuator system and having a driver surface mechanically coupled to the handle. A monitor system is electrically coupled with the controller system and arranged to monitor deflection of the cantilever. A pad arranged to permit for mechanical decoupling at a location between the tip and the driver surface.

The above summary of the invention is not intended to describe each illustrated embodiment or every implementation of the present invention. The detailed description and claims that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
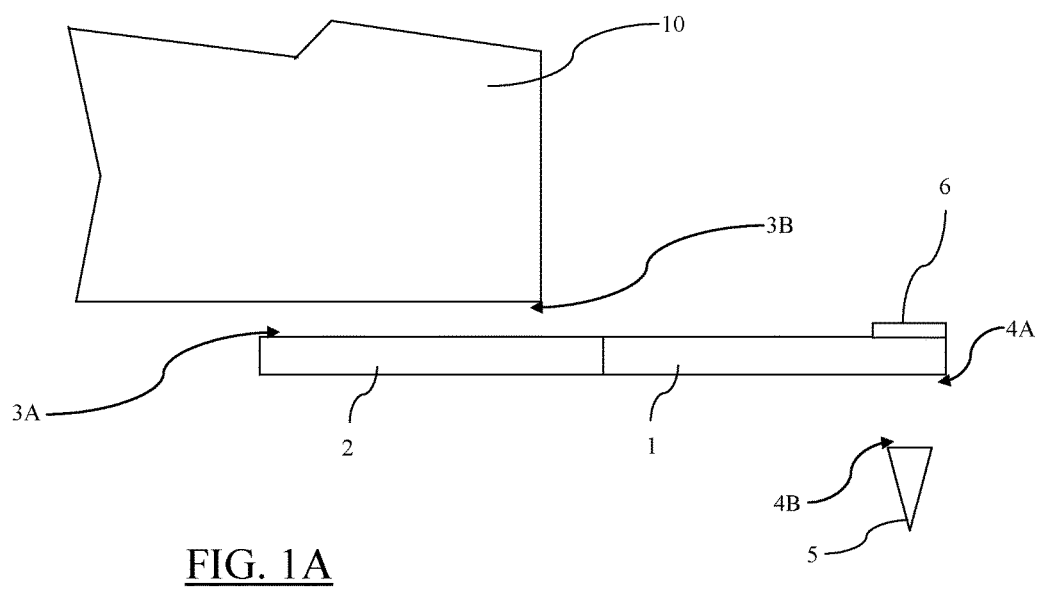
FIG. 1A is an exploded side view of a tip, cantilever, and driver of an AFM system, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

An AFM system and methods for using the same are disclosed which facilitate rapid and accurate replacement of the probe tip, and/or the cantilever. In embodiments, a cantilever and tip and/or cantilever and handle are separable and coupled to one another by a non-permanent mechanism such as a releasable adhesive or polymer. As such, in embodiments the tip or handle can be detached from the cantilever or driver, respectively, reducing or eliminating the need for subsequent recalibration.

Figure 1B:
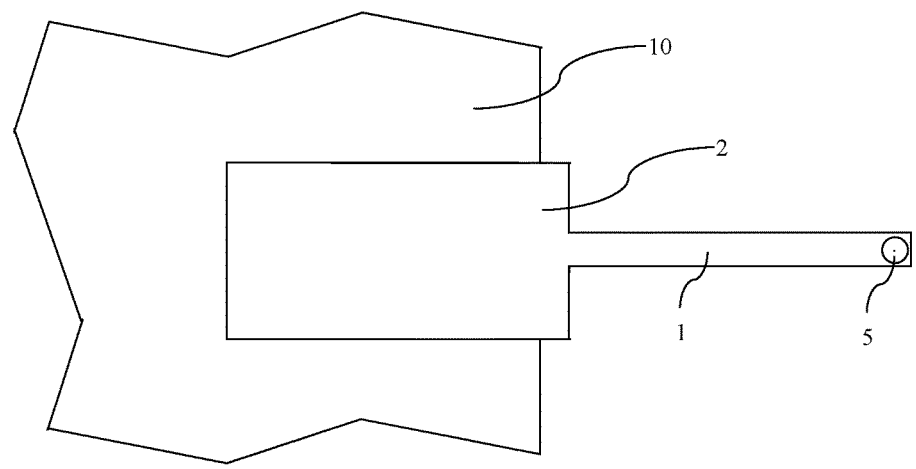
FIG. 1B is a bottom view of the AFM system of FIG. 1A.

FIG. 1A is an exploded side view of an AFM system, and FIG. 1B is a bottom view of the same, according to an embodiment. The system shown in FIGS. 1A and 1B includes a cantilever 1, a handle 2, a first interface between a top surface 3A of the handle 2 and a driving surface 3B, a second interface between a bottom surface 4A of the cantilever and a base surface 4B of a probe tip 5, a reflective pad 6, and a driver 10.

The characteristics of cantilever 1 determine the fundamental operation of an AFM system, in that the thickness and length of cantilever 1 correlate with the frequency of oscillations of the overall system. In an ideal cantilever probe, the spring constant k is defined by $$k = \frac{Ewt^3}{4L^3},$$

where E is Young's modulus, w is the cantilever arm width, t is the cantilever arm thickness, and L is the cantilever arm length.

As shown in FIGS. 1A and 1B, cantilever 1 extends from handle 2 at a proximal end to the probe tip 5 at or near a distal end. In general, as indicated by the equation above, a thicker cantilever corresponds to a larger spring constant. Resonant frequency of oscillation of the overall system shown in FIGS. 1A and 1B approximates that of a simple spring-mass system; that is, the natural frequency increases proportionally to the square root of the spring constant. The length of the cantilever 1 also affects resonant frequency. All else being equal, the natural frequency of oscillation is lower for a longer cantilever length, and higher for a shorter cantilever length.

Handle 2 is directly mechanically connected to cantilever 1. In embodiments, handle 2 can be made of the same material as cantilever 1. For example, cantilever 1 and handle 2 can be etched from a common material using a mask. In embodiments, the masking and etching processes used to form handle 2 and cantilever 1 can be complex, such that cantilever 1 and handle 2 can have different thicknesses, shapes, or material compositions from one another.

Handle 2 defines a top surface 3A that is configured to engage with an adjacent driving surface 3B. Top surface 3A can be modified, as described in more detail with reference to the following figures, in order to engage with a driving surface 3B. In embodiments, one or both of top surface 3A and driving surface 3B can be coated with a material that promotes adhesive wetting, such as a soft material or a hot melt adhesive. In one embodiment, the material disposed at the interface is polydimethylsiloxane (PDMS).

Similarly, cantilever 1 has a bottom surface 4A at its distal end that is configured to engage with an adjacent base surface 4B of probe tip 5. Like the first interface between top surface 3A and driving surface 3B, the interface between bottom surface 4A and base surface 4B can include a material configured to affix the adjacent structures, such as a soft material that promotes wetting and adhesion, or an adhesive. While FIG. 1A shows these components in exploded view, in operation top surface 3A is coupled to driving surface 3B, and bottom surface 4A is coupled to base surface 4B, such that tip 5 is a mass attached to the end of a cantilever. Where the mass of tip 5 as well as the geometry of cantilever 1 are known, cantilever 1 will oscillate at a predictable, known frequency. Variations in this frequency, caused by proximity or contact with a surface, can be used to map the features of an underlying substrate.

Reflective pad 6 is arranged opposite cantilever 1 from tip 5, and can be used in coordination with a collimated light source (not shown) such as a laser. In operation, a light beam is directed to reflective pad 6 by the collimated light source and reflected to a detector (not shown). The detector can ascertain the level of deflection in contact mode operation, or the frequency of oscillation in tapping mode operation, of cantilever caused by the underlying sample (not shown, but see e.g. sample 107 of FIG. 2).

Driver 10, as partially shown in FIGS. 1A and 1B, is used to position tip 5 during operation. In embodiments, driving surface 3B of driver 10 is mechanically coupled to top surface 3B of handle 2, which is commonly formed with cantilever 1. Bottom surface 4A of cantilever 1 is mechanically coupled to top surface 4B of tip 5.

Conventionally, probe tip 5 is permanently affixed to cantilever 1. The mode of affixation of probe tip 5 to cantilever 1 varies according to the fabrication process of the cantilever probe assembly. In some cases, the cantilever 1 and probe tip 5 are separately fabricated, and later assembled using an adhesive, fusion, sintering, or other permanent fixation process. In other cases, cantilever 1 and probe tip 5 are integrally formed during processing In one aspect of the invention, probe tip 5 is removable from cantilever 1. For operation of the SPM, probe tip 5 is affixed to cantilever 1 in such a fashion that probe tip 5 is separable, and therefore replaceable, by another tip. In embodiments, this can be accomplished by affixing providing a pad of a material having sufficient adhesion to semi-permanently bond the tip to the cantilever, or the handle to the driver, or both. Such attachment can be semi-permanent such that, during normal use such as for tapping mode scanning, the attachment is secure and results in no or negligible movement between the components so connected. Conversely, when a component has reached the end of its useful life, the attachment is not so permanent that the retired component cannot be detached. The detachment can be accomplished without damage to adjacent components, and a new component can be attached where the retired component was removed.

Figure 2:
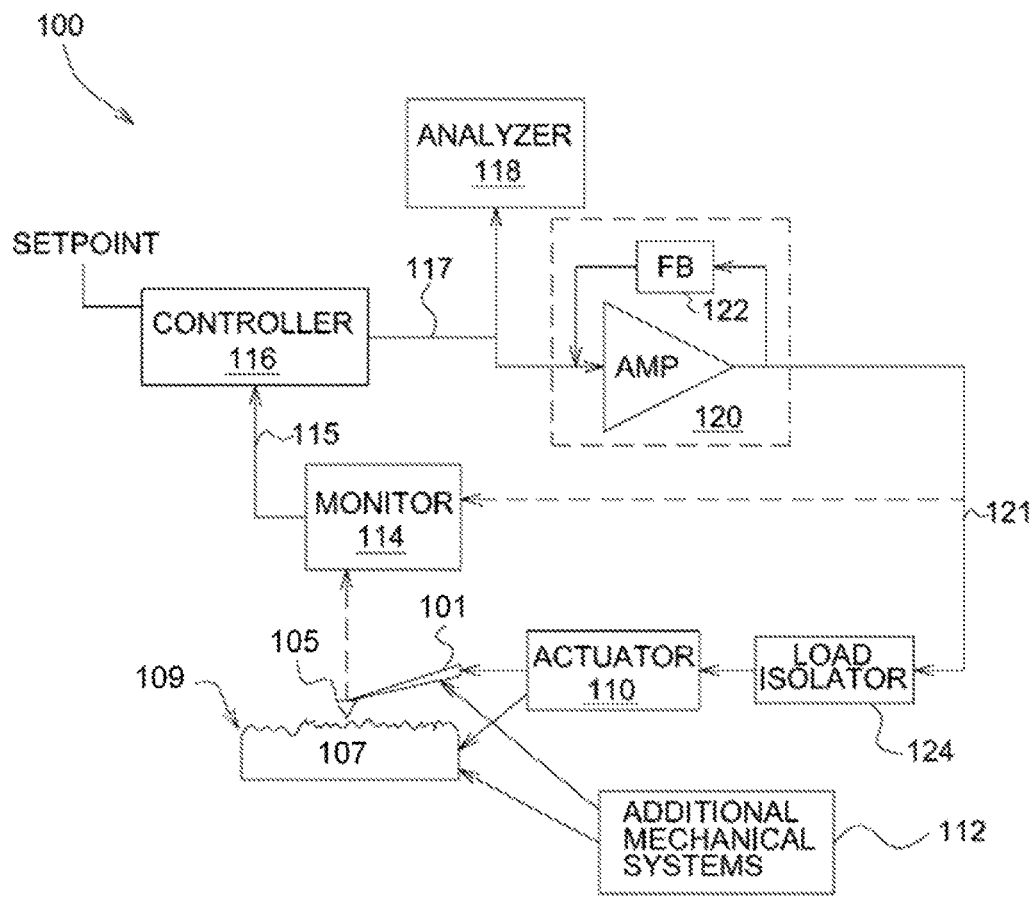
FIG. 2 is a schematic view of an AFM system, according to an embodiment.

In embodiments, driver 10 can be driven across a sample (e.g., sample 107 as shown in FIG. 2) to detect surface characteristics thereof. Driver 10 can be used not only to position probe tip 5 relative to the underlying sample, but in embodiments can also produce oscillation in cantilever 1, in embodiments. For example, in one embodiment driver 10 comprises a piezoelectric component configured to expand and contract at a desired frequency. In alternative embodiments, driver 10 can include a stack of piezoelectric components configured to generate any of a range of desired frequency and amplitude of oscillations.

The embodiment shown in FIGS. 1A and 1B is only one of a variety of embodiments in which the tip 5 and/or handle 2 can be separated from the driver 10. In alternative embodiments, for example, an enlarged pad at the distal end of cantilever 1 can be provided to increase the surface area of lower surface 4A and facilitate attachment to probe tip 5. In another embodiment, probe tip 5 can be attached to cantilever 1 with its base surface 4B at different positions closer or further away from distal end. In other embodiments, cantilever 1 can be shaped differently, such that it is not a rectangular prism but rather has slanted edges due to etching, or the enlarged lower surface 4A, etc. Furthermore, as previously discussed, different widths, lengths, and thicknesses can be embodied in cantilever 1. For example, a shorter cantilever 1 can be used in embodiments wherein a fast oscillation is desired. These and other differences in the geometry of cantilever 1 can affect frequency of vibration.

In alternative embodiments, reflective portion 6 could extend across the entire surface of cantilever 1 between handle 2 and the distal end, for example. In other embodiments, some other portion of cantilever 1, rather than just the portion opposite cantilever 1 from probe tip 5, can be coated with the reflective material.

In still further embodiments, probe tip 5 can be commonly formed with cantilever 1. This permits greater control in the position, relative to the proximal and distal ends of cantilever 1, at which probe tip 5 is positioned. In such embodiments, there is no base surface 4B configured to mate with lower surface 4A of cantilever 1, because the two pieces are commonly formed. Thus, in some such embodiments, only the interface at which driving surface 3A couples to upper surface 3B includes a material configured to non-permanently affix the adjacent components, driver 10 and handle 2.

FIG. 2 is a top-level diagram illustrating a portion of a typical Scanning Probe Microscope (SPM) system 100. System 100 includes cantilever 101 that holds probe tip 105, as previously described with respect to cantilever 1 and probe tip 5 of FIGS. 1A and 1B. Probe tip 105 is used to inspect sample 107 having surface 109. Surface 109 has a certain topography, which is the subject of the inspection in certain applications. The term topography is defined herein as a representation of a three-dimensional profile of a sample or of a portion of a sample, including, but not limited to, surface features of a sample.

The inspection is accomplished by situating probe tip 105 relatively to surface 109 by moving either cantilever 101, sample 107, or both, in order to establish a detectable interaction between surface 109 and probe tip 105. Probe tip 105 is scanned over or across the sample while probe tip 105 tracks the topography of sample 107, such as, for example, the topography of surface 109. Tracking of the topography includes, without limitation, following features present on the sample, such as, for example, lines, troughs, walls, corners, cavities, protrusions, and the like.

In one embodiment, as illustrated in FIG. 2, SPM system 100 includes an actuator subsystem in which actuator 110 (similar to driver 10 of FIGS. 1A and 1B) adjusts the probe-sample interaction by moving cantilever 101 relative to surface 109 to produce motion. Persons skilled in the relevant arts will appreciate that SPM system 100 can be constructed such that the mechanical structure, including the couplings between probe tip 105 and sample 107, reduce or avoid damping, resonating, or otherwise interacting with the relative motion between the probe and the sample. For instance, actuator 110 may be rigidly mounted to a chassis to which sample 107 is also rigidly mounted.

Additional mechanical systems 112 may also be provided that would include actuators to move cantilever 101 or sample 107, or both, such that the relative motion of probe tip 105 and surface 109 is along the plane that is generally parallel to surface 109. For simplicity, this motion shall be termed motion in the x-y directions or along the x- or y-axes. This motion in the x-y directions facilitates the scanning of probe tip 105 over surface 109. As probe tip 105 is scanned over sample 109, actuator 110 adjusts the relative positioning of cantilever 101 and surface 109 to produce motion 202 to maintain a generally constant level of probe-sample interaction, which results in probe tip 105 tracking the topography of surface 109. In oscillating mode systems, the probe-sample interaction can be averaged over the oscillation cycle to produce a corresponding scalar representing the level of probe-sample interaction to be maintained as probe tip 105 is scanned over surface 109.

Additional mechanical systems 112 can facilitate the oscillatory motion of cantilever 101 for those embodiments that operate in oscillating mode, or include a coarse adjustment along the z axis for fast engagement and disengagement of probe tip 105 and surface 109, in embodiments. In certain situations, such as where the topography changes beyond the range of actuator 110, the coarse z-axis adjustment provided by additional mechanical systems 112 may be used to reposition cantilever 101 or sample 107 to operate actuator 110 within its displacement range.

In one type of embodiment, the actuators for the x, y and z axes are piezoelectric stacks. In related embodiments, the actuators can also employ any number of alternative actuation technologies, including but not limited to, other piezoelectric devices, actuators formed from electrostrictive, magnetostrictive, electrostatic, inductive, and/or voice coil drive mechanisms and other actuators that generate a motion in response to an input signal.

Figure 3:
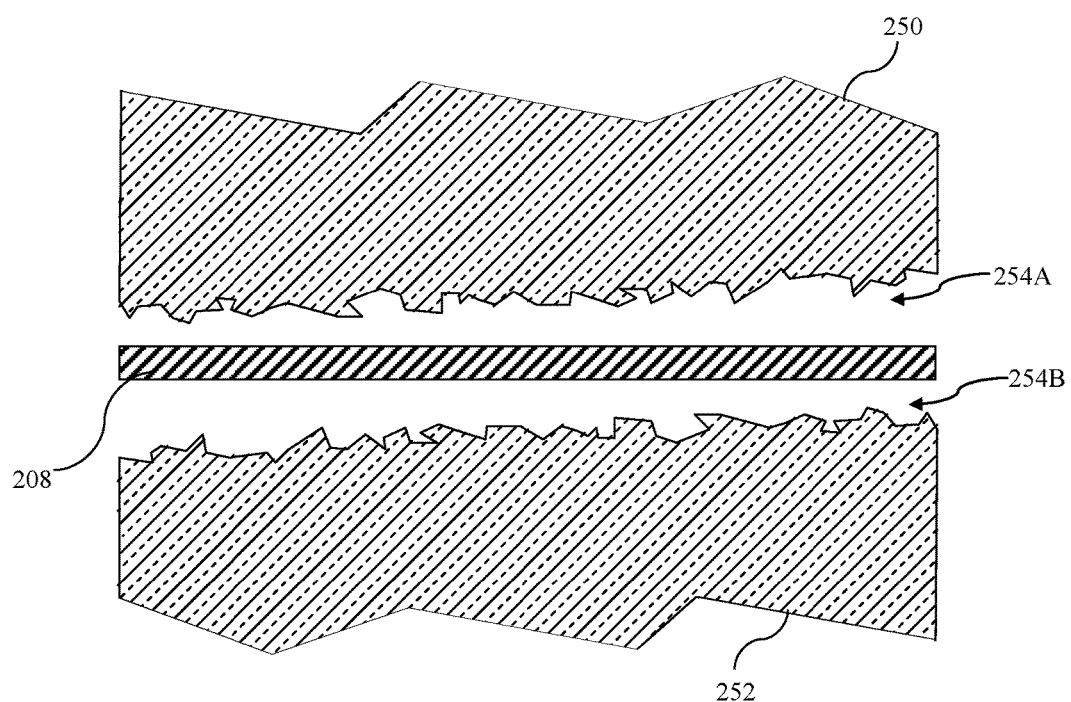
FIG. 3 is a cross-sectional view of two surfaces and a conformable pad for promoting van der Waals attraction therebetween, according to an embodiment.

FIG. 3 is an exploded hypothetical cross-sectional view of an upper object 250 and a lower object 252 and a pad 208. Pad 208 can be used to increase the adhesion between upper object 250 and lower object 252. In embodiments, pad 208 is made of a deformable material such as a thermoplastic polymer.

In general, when two surfaces are brought into sufficient proximity with one another, van der Waals forces promote adhesion between those two surfaces. For most objects, the roughness of those two surfaces is sufficient such that only 1% or less of the surface area is in close enough proximity to any adjacent object to exhibit van der Waals adhesion. For example, first surface 254A and second surface 254B are rough enough that only a small portion of the surface area of first surface 254A would be close enough to any part of second surface 254B to cause van der Waals interactions.

Pad 208 increases adhesion between upper object 250 and lower object 252, because it sufficiently plastic to flow into the features that are caused by the roughness of first surface 254A and second surface 254B. Thus, if upper object 250 and lower object 252 are brought together from the positions shown in FIG. 3, there would be a greater level of van der Waals interaction than in the case where pad 208 is not present.

In an atomic force microscope system such as the one shown in FIGS. 1A and 1B, use of pad 208 can promote adhesion between bottom surface 4A and base surface 4B, or between upper surface 3A and drive surface 3B. By using a conformable pad 208, sufficient van der Waals force can be generated to form a temporary bond sufficient to hold tip 5 to cantilever 1, or to hold handle 2 to driver 10, during use. Such a van der Waals bond, however, can be overcome in order to perform a tip change, or a cantilever change, as desired, without damaging the bonded components.

Figure 4:
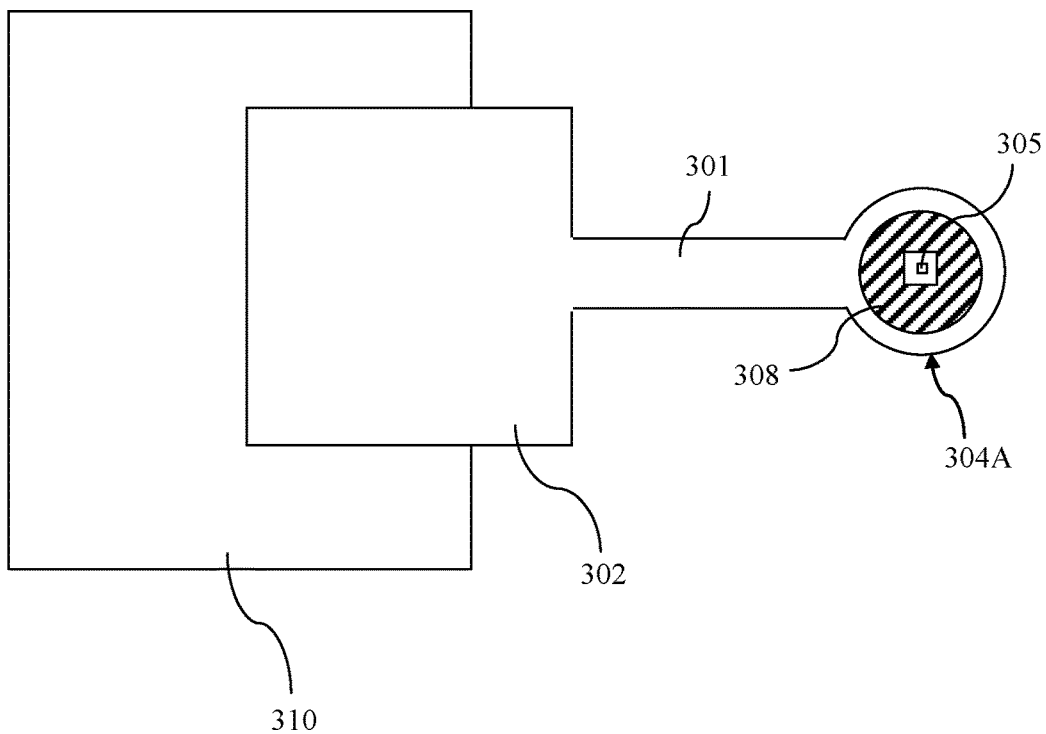
FIG. 4 is a bottom view of one embodiment of a cantilever probe having an enlarged, paddle-style distal end.

FIG. 4 is a bottom view of an embodiment in which a pad 308 is arranged on a bottom surface 304A of a cantilever 301. As shown in FIG. 4, bottom surface 304A has an enlarged, circular profile as compared to the remainder of cantilever 301, and tip 305 can be positioned anywhere along the pad 308.

The large profile of bottom surface 304A provides a larger surface area than what is available from the narrow neck portion of cantilever 301 for providing a laser beam target in the laser beam deflection systems of SPM instruments. In one embodiment, bottom surface 304A has a generally round profile with a diameter in the range of 2-4 microns. In alternative embodiments, bottom surface 304A may be no wider than the remainder of cantilever 301, as shown for example in FIGS. 1A and 1B, for systems which use a sufficiently small laser spot or for SPM systems that do not use optical means for determining cantilever deflection.

In various embodiments, the length of cantilever 301 is longer than a diameter of bottom surface 304A, as shown in FIG. 4. In other embodiments, the length of the cantilever can be shorter than the diameter of the lower surface. In embodiments where tip 305 is to be replaced, a smaller pad 308 can result in more precise positioning of a replacement tip. Among various embodiments, the relative dimensions can vary depending on the desired spring constant, desired resonance frequency, material properties, tip placement precision, laser spot size, and other parameters.

Pad 308 is shown with hatching in FIG. 4, extending across a portion of lower surface 304A or cantilever 301. Pad 308 can be a material that bonds to tip 305 in a non-permanent fashion, such as by van der Waals forces, as previously described with respect to FIG. 3. In general, materials having relatively soft rheological properties can adhere to other surfaces by wetting and van der Waals interaction. As such, when tip 305 is no longer sharp or when a different tip 305 is desired for some other reason, tip 305 can be removed and replaced without changing cantilever 301 or handle 302.

In embodiments, pad 308 can be made of a soft polymer. In other embodiments, pad 308 can be a hot-melt adhesive. In embodiments, pad 308 comprises a material that has relatively low levels of outgassing at low pressure. For example, pad 308 could be a polydimethylsiloxane, a polyisobutylene, or some other material that does not exhibit significant outgassing and also is sufficiently soft to provide good adhesion between the adjacent components due to van der Waals interactions. In embodiments, pad 308 can be arranged on lower face 304A in a pattern or size that causes tip 305 to be picked up at a specific location or in a desired orientation.

Additionally or alternatively, as described in more detail below, handle 302 can be coupled to driver 310 in a similar fashion, by using van der Waals interaction to form a non-destructively separable bond. Each non-permanent bond allows for replacement of a different component of the overall system. For example, in some contexts, it may be desirable to have easily replaceable tips 305 without losing position calibration. In other contexts, it may be desirable to replace an entire handle 302 and cantilever 301, such as to replace it with one having different spring constant or length, without losing position calibration. In still further contexts, it may be desirable to easily replace both the tip 305, and the cantilever 301 and handle 302, either at the same time or at different times of operation.

Figure 5A:
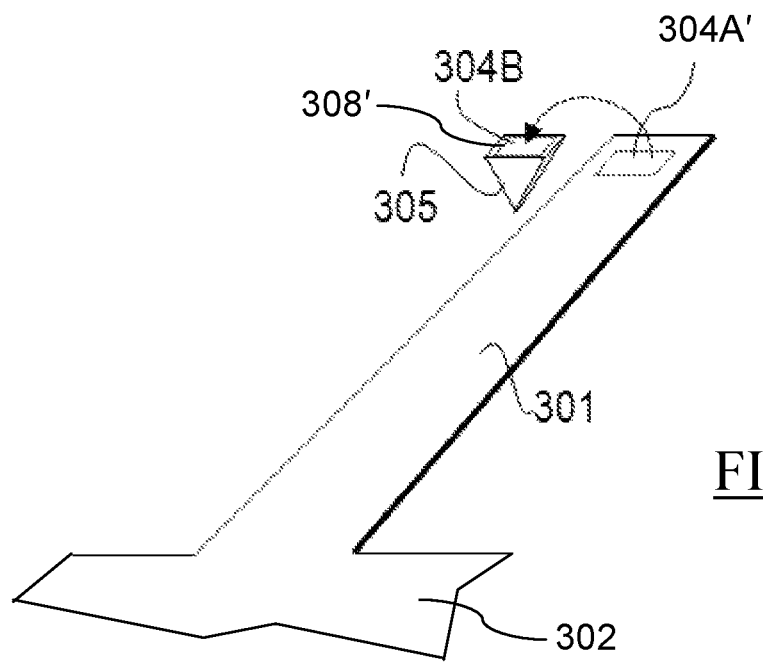
FIG. 5A is a schematic diagram illustrating a cantilever probe that includes a separately-fabricated cantilever arm and probe tip, wherein the tip is attachable and removable and includes a pad, according to one embodiment.
Figure 5B:
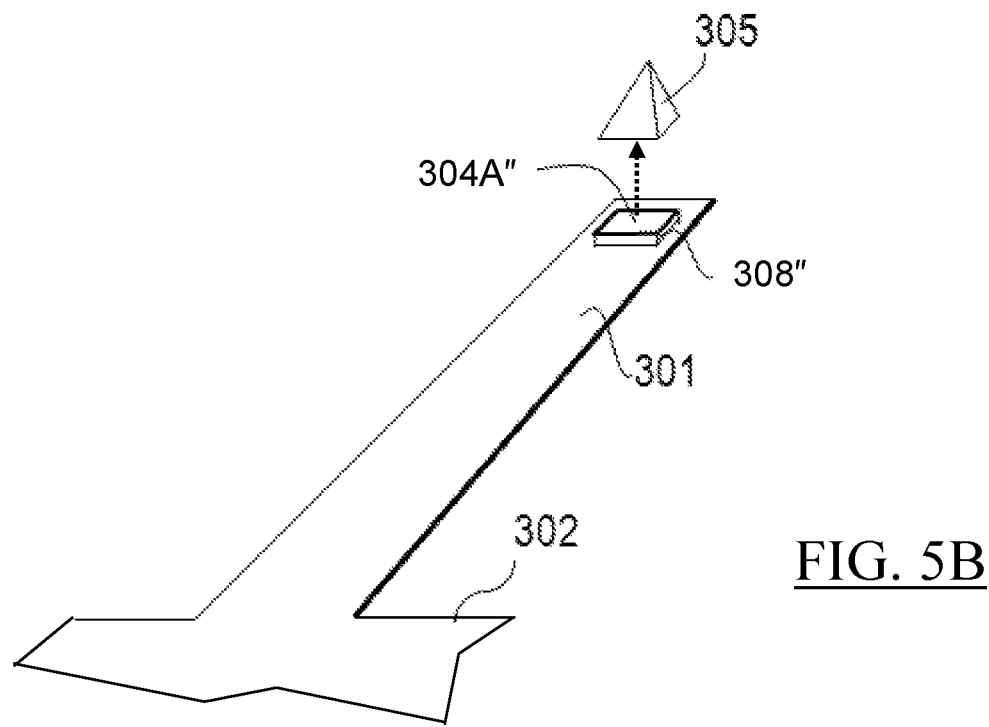
FIG. 5B is a schematic diagram illustrating an alternative embodiment in which a pad is arranged on the cantilever.

FIGS. 5A and 5B show alternative embodiments in which a pad (308' and 308", respectively) is arranged between a tip 305 and a bottom surface (304A' and 304", respectively) of a cantilever 301. The embodiments shown in FIGS. 5A and 5B are shown with tip 305 removed. In FIG. 5A, pad 308' is arranged on tip 305 and bottom surface 304A' is substantially coplanar with the rest of the face of cantilever 301 on which it is arranged. In the embodiment shown in FIG. 5B, pad 308" is arranged on bottom surface 304A".

Cantilever 301 can be formed using a conventional etching process or other suitable technique. Cantilever 301 can be formed from silicon, silicon nitride, silicon dioxide, or other suitable material. Cantilever 301 can also be made from a composite of different materials. Notably, in the embodiment shown in FIGS. 5A and 5B, cantilever 301 is formed without an integral tip.

Tip 305 is separately formed using a conventional, or other suitable technique. Tip 305 can be made from silicon, carbon compounds, another suitable material, or a composite of different materials, in various embodiments. Tip 305 can have a variety of shapes, with the apex centered over the base of the tip 305 as shown in FIGS. 5A and 5B or with the apex aligned over a corner of the base in a "visible tip" arrangement, or in any other arrangement.

In one embodiment, tip 305 and cantilever 301 are made from the same material or combination of materials. In another embodiment, tip 305 and cantilever 301 are each made from a different material or combination of materials from the other.

Figure 6:
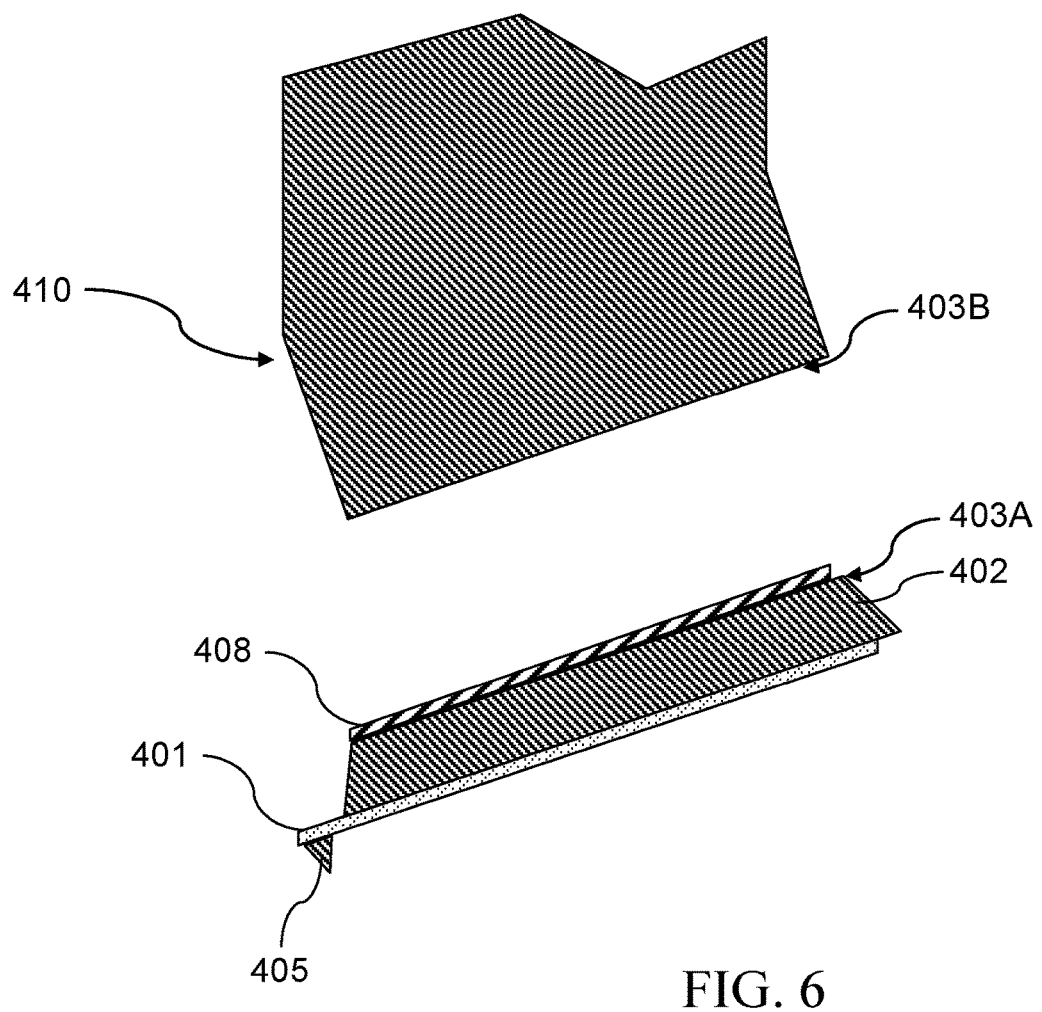
FIG. 6 is a cutaway side view of a driver and AFM probe, according to an embodiment in which a conformable pad is arranged on the handle.

Similarly, as shown in FIG. 6, pad 408 can be arranged between handle 402 and driver 410. In embodiments, driver 410 can have a driving surface 403B that is made of Teflon or another surface that is sufficiently smooth that, using a pad 408 that is sufficiently soft or deformable, van der Waals force can hold the combination of cantilever 401, handle 402, and tip 405. In alternative embodiments, pad 408 could be arranged on drive surface 403B, rather than on top surface 403A, and can be used multiple times and with one or multiple different handles 402.

In embodiments, the pads 308, 308', 308", 408 can be composed of a soft, deformable material such as polydimethylsiloxane (PDMS). In embodiments, such pads can have a thickness of between about 500 nm and about 20 µm. In one embodiment, a pad (similar to 308, 308', 308", 408) can be about 1 µm thick. In embodiments, the thickness is chosen such that there is close to 100% contact between the pad and the adjacent materials. In such embodiments, retention of the tip is ensured by the geometry of the tip: the interfacial surface area of the pad at the interface of the adjacent surfaces and the material composition of the tip and cantilever arm produce sufficient adhesive/cohesive intermolecular force therebetween that exceeds any force that would tend to separate the tip from the cantilever during scanning operation of the AFM.

In a related embodiment, each of adjacent surfaces—whether tip and cantilever or handle and driving surface—is specially prepared to maximize the interfacial adhesion/cohesion. For instance, each adjacent surface can undergo a polishing operation during its fabrication to increase the number of interaction points between the surfaces. In another embodiment, a thin film layer is applied to one, or both, of the adjacent surfaces to enhance adhesion/cohesion and van der Waals interaction.

Figure 7:
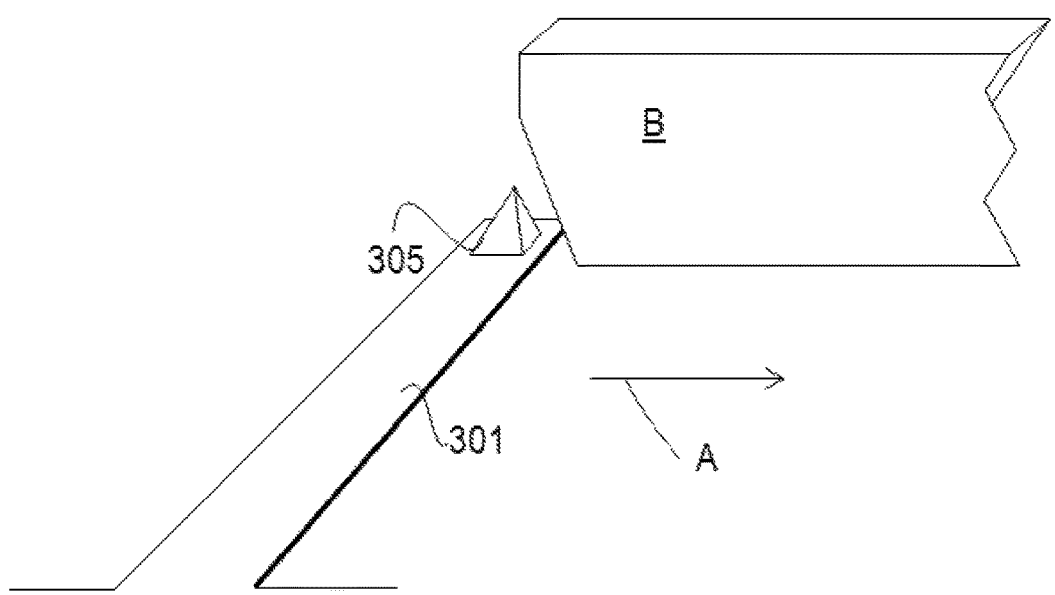
FIG. 7 is a perspective view of a tip being removed from a cantilever, according to an embodiment.

In embodiments, as shown in FIG. 7, the adhesion between the adjacent surfaces can be overcome using sufficient application of force applied orthogonal to the direction in which tip 305 is moved during tapping-mode operation. This direction is shown using the arrow "A" in FIG. 7, with tip 305 coming into contact with block B to remove tip 305 from cantilever 301. When such adhesion is overcome, tip 305 is displaced from cantilever 301 in a non-destructive manner and a new tip (not shown) can be placed on cantilever 301 in its place.

In one embodiment, tip 305 and cantilever 301 are constructed such that the adhesive/cohesive intermolecular force that retains the attachment of tip 305 to cantilever 301 (hereinafter, the "retention force") is at least three orders of magnitude greater than the worst-case separating force, but less than a force sufficient to materially change, or damage (i.e., break or deform), any part of cantilever 301. In a related embodiment, the retention force is at least six orders of magnitude greater than the worst-case separating force but less that the force sufficient to damage any part of cantilever 301.

Figure 8:
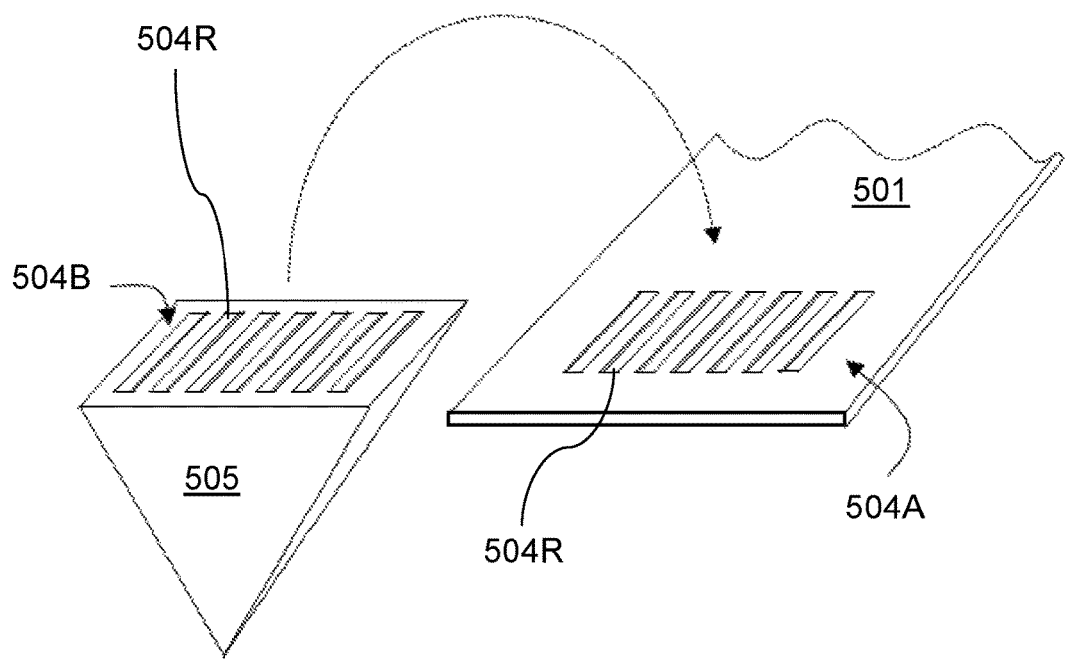
FIG. 8 is a perspective view of a separately-formed cantilever and tip, wherein each of the cantilever and tip include anisotropic retention features, according to an embodiment.

FIG. 8 is a schematic diagram illustrating a related embodiment in which cantilever 501 and tip 505 each include textural features to enhance retention of tip 505. In particular, bottom surface 504A and base surface 504B each include retention features 504R. Cantilever 501 includes retention features 504R that are designed to mate with the retention features 504R on base surface 504B of tip 505 as illustrated. In the embodiment depicted, retention features 504R each include indentations or protrusions. For instance, retention features 504R on tip 505 can include a series of indentations, while textural features 504R on cantilever 501 can include a series of indentations, or vice versa, in embodiments.

In the present example, retention features 504R are elongated along the same direction as the major axis of cantilever 501 (i.e., the direction from its proximal end towards its distal end), such that tip 505 is retained with greater force against lateral shear forces along its minor axis than shear forces along is major axis. With this arrangement, tip 505 is more easily removed when sheared in a first direction (in this case, the direction of the major axis), than in a second direction (along the direction of the minor axis). In a related embodiment, scanning of the sample by tip 505 is performed in raster fashion with the raster strokes being along the minor axis, such that shorter strokes to move from one raster position to the next are made along the major axis. Removal of tip 505 can be performed by shearing along the major longitudinal axis.

In another embodiment (not shown) structural features that increase the retention of tip 505 onto cantilever 501 are symmetrical with respect to major and minor axes. For instance, the structural features can take the form of a grid-like pattern of protrusions and indentations. In another related embodiment, retention features 504R on cantilever 501 include at least one aperture through the body of cantilever 501, into which one or more protrusions of the tip 505 can be inserted and removed.

Figure 9A:
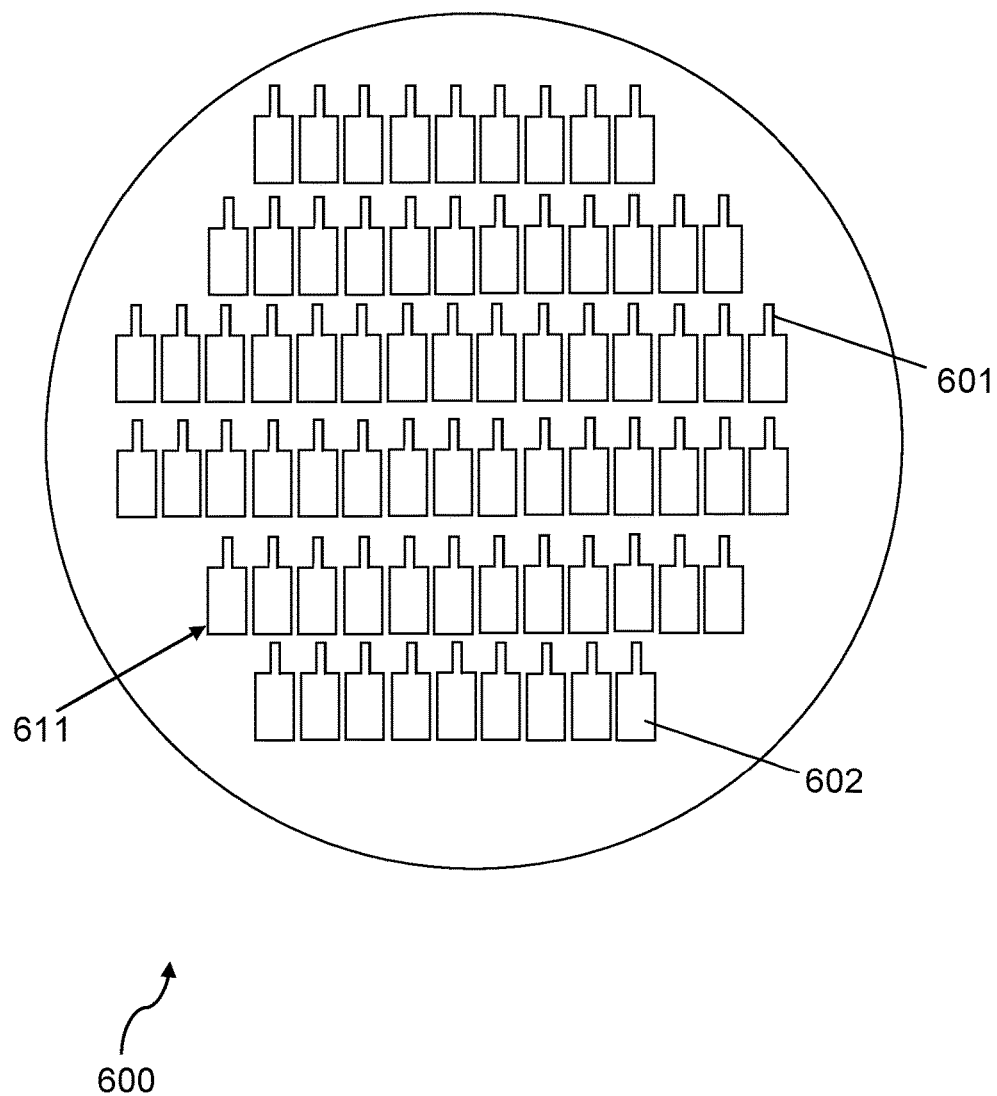
FIGS. 9A-9C depict a wafer and various locations at which pads can be arranged, according to embodiments.

FIG. 9A is a top view of a wafer 600 including a plurality of probes 611 for use in an AFM system, wherein each probe 611 includes a cantilever 601 and a handle 602. The features of the probes 611 are exaggerated in FIG. 9A for clarity. In an actual system, cantilever 601 may be proportionally much smaller with respect to handle 602. In various embodiments, relatively more or fewer probes 611 can be generated from each wafer 600.

Wafer 600 can be a deposited wafer of any suitable material for use as an AFM probe, as described in more detail above. Wafer 600 can be epitaxially grown, or cut from a boule, or deposited or grown in some other way. In embodiments, probes 611 are then formed in wafer 600 by selective etching.

Figure 9B:
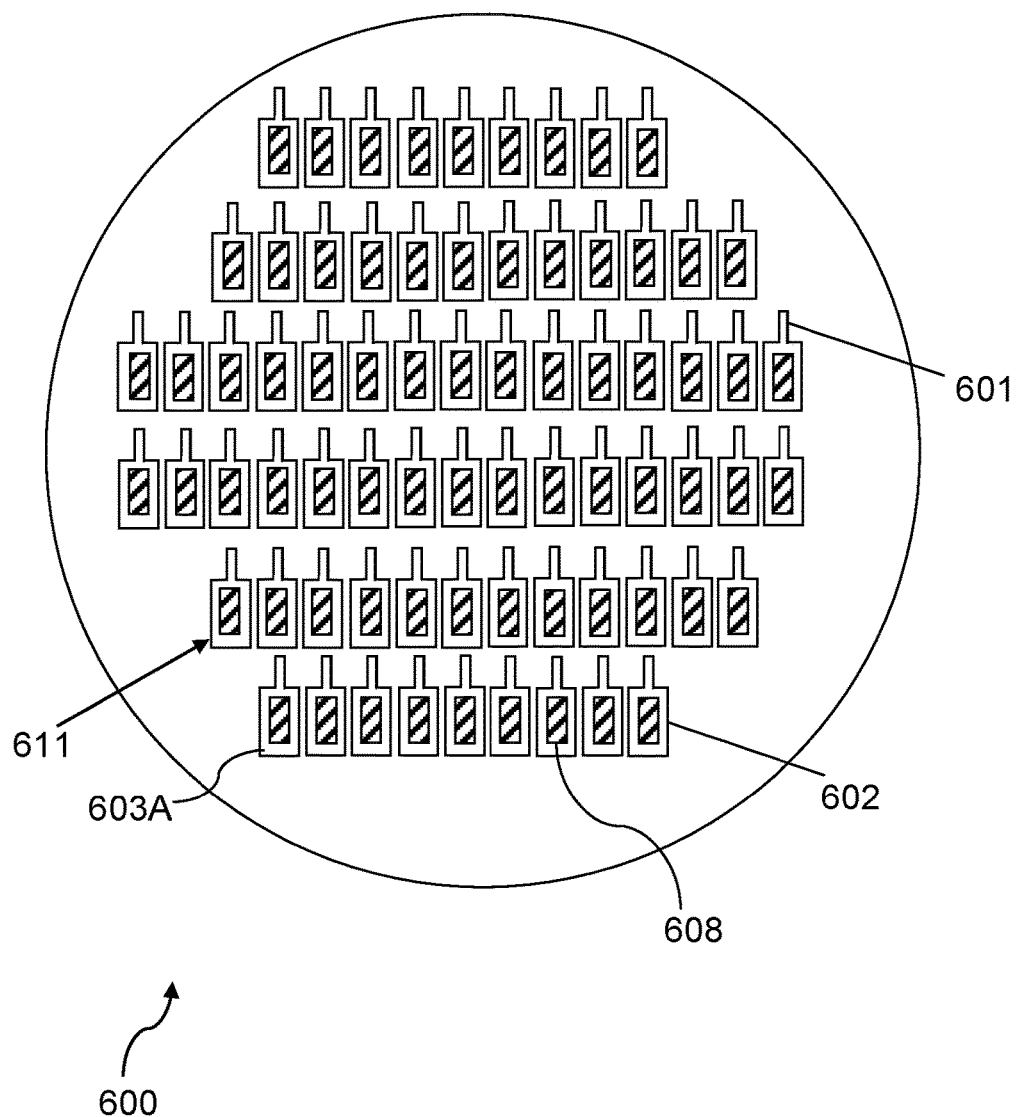
Figure 9C:
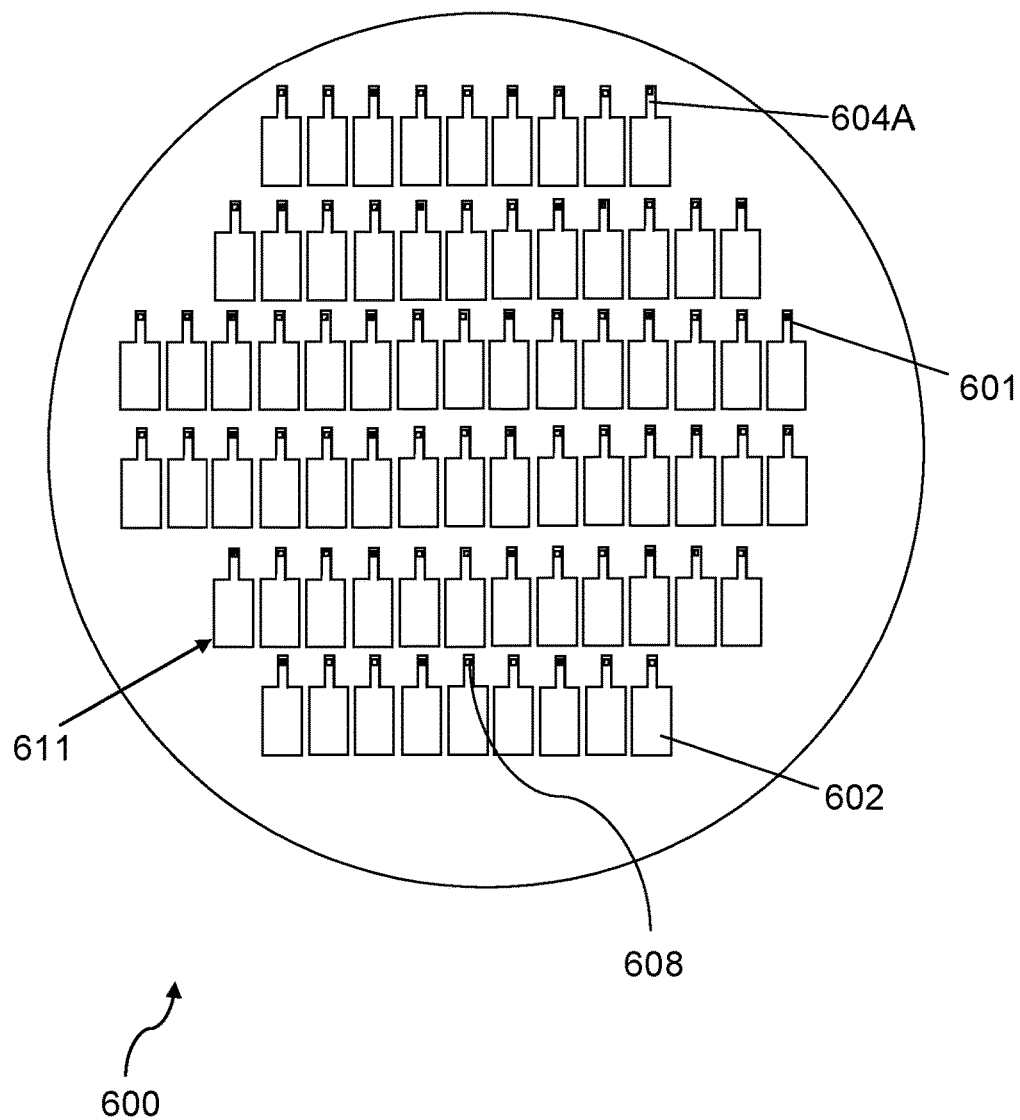

FIG. 9B depicts the wafer 600 of FIG. 9A, wherein pads 608 are deposited on top surface 603A of handles 602. Similarly, FIG. 9C depicts the wafer 600 of FIG. 9A, wherein pads 608 are deposited on bottom surface 604A of cantilever 601. In embodiments, deposition of pads 608 on handles 602 or cantilevers 601 can occur after deposition and etching of wafer 600.

Pads 608 can be applied to top surface 603A of handles 602 where the tip (e.g., tip 5 of FIGS. 1A-1B) is arranged facing into the page. In contrast, pads 608 can be applied to the bottom surface 604A of cantilevers 601 if a removable tip (e.g., tip 5 of FIGS. 1A-1B) is arranged facing out of the page. Applying pads in both the locations indicated in FIGS. 9B and 9C at the same time would result in a tip facing upwards out of the page, as well as a connection between handle 602 to a driver upwards out of the page. Due to physical constraints in common AFM systems with respect to sample placement, this arrangement is not conventionally used. As such, to apply pads 608 at both locations would typically involve flipping wafer 600. It is contemplated that a single pad may be used in some embodiments, only one interface (e.g., the interface between handle 602 and a driver, or the interface between cantilever 601 and a removable tip) is provided with pad 608, while in others, two pads 608 can be provided on opposite sides of wafer 600, with additional processing steps used to flip wafer 600 between separate deposition steps.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A cantilever probe system comprising:
    a cantilever having a proximal end and a distal end, the distal end having a bottom surface;
    a handle mechanically coupled to the proximal end of the cantilever, the handle having an upper surface;
    a tip mechanically coupled to the bottom surface of the cantilever; and
    a pad arranged on the upper surface and configured to reversibly mechanically couple the upper surface to an adjacent driver.

2. The cantilever probe system of claim 1, wherein the pad is configured to mechanically couple the upper surface to an adjacent driver via van der Waals interactions.

3. The cantilever probe system of claim 1, wherein the pad is a conformable polymer.

4. The cantilever probe system of claim 1, wherein the pad comprises polydimethylsiloxane.

5. The cantilever probe system of claim 1, wherein the pad is configured to removably adhere the handle and the adjacent driver such that the handle, cantilever, and tip can be removed and replaced in a non-destructive manner.

6. The cantilever probe system of claim 1, wherein the tip and the cantilever are integrally formed with one another.

7. The cantilever probe system of claim 6, wherein the handle and the cantilever are integrally formed with one another.

8. A cantilever probe system comprising:
- a cantilever having a proximal end and a distal end, the distal end having a bottom surface;
- a handle mechanically coupled to the proximal end of the cantilever, the handle having an upper surface;
- a tip mechanically having a base coupled to the bottom surface of the cantilever; and
- a pad arranged on the bottom surface and configured to reversibly mechanically couple the bottom surface to the base, wherein the pad is configured to mechanically couple the bottom surface to the base via van der Waals interactions.

9. The cantilever probe system of claim 8, wherein the pad is a conformable polymer.

10. The cantilever probe system of claim 8, wherein the pad comprises polydimethylsiloxane.

11. The cantilever probe system of claim 8, wherein the pad is configured to removably adhere the bottom surface and the base surface such that the tip can be removed from the cantilever and replaced in a non-destructive manner.

12. The cantilever probe system of claim 8, wherein the handle and the cantilever are integrally formed with one another.

13. A scanning probe microscope (SPM) or atomic force microscope (AFM) system comprising:
- an actuator system configured to impart relative motion between a cantilever probe system and a sample, the cantilever probe system including:
  - a handle defining an upper surface;
  - a cantilever extending from a proximal end at the handle to a distal end, the distal end defining a bottom surface; and
  - a tip that includes a base surface and an apex opposite the base surface;
- a controller system electrically coupled with the actuator system and configured to control motion and positioning of the actuator system;
- a driver coupled to the actuator system and having a driver surface mechanically coupled to the handle; and
- a monitor system electrically coupled with the controller system and arranged to monitor deflection of the cantilever; and
- a pad arranged to permit for mechanical decoupling at a location between the tip and the driver surface, wherein the pad is a conformable polymer.

14. The system of claim 13, the pad is arranged between the base surface of the tip and the bottom surface of the cantilever.

15. The system of claim 13, wherein the pad is arranged between the top surface of the handle and the driver surface.

16. The cantilever probe system of claim 13, wherein the pad comprises polydimethylsiloxane.

17. The cantilever probe system of claim 14, wherein the pad is configured to removably adhere the bottom surface and the base surface such that the tip can be removed from the cantilever and replaced in a non-destructive manner.

18. The cantilever probe system of claim 15, wherein the pad is configured to removably adhere the top surface and the driver surface such that the handle can be removed from the actuator system and replaced in a non-destructive manner.

* * * * *